United States Patent [19]
Kaneko et al.

[11] Patent Number: 6,008,617
[45] Date of Patent: *Dec. 28, 1999

[54] MOTOR CONTROL DEVICE FOR HIGH FREQUENCY AC DRIVEN MOTOR

[75] Inventors: Satoru Kaneko, Urizura-machi; Ryoso Masaki, Hitachi; Sanshiro Obara, Tokai-mura; Yuusuke Takamoto, Hitachinaka, all of Japan

[73] Assignee: Hitachi, Ltd., Japan

[*] Notice: This patent is subject to a terminal disclaimer.

[21] Appl. No.: 09/198,503

[22] Filed: Nov. 24, 1998

Related U.S. Application Data

[63] Continuation of application No. 08/859,087, May 20, 1997, Pat. No. 5,841,263.

[30] Foreign Application Priority Data

May 20, 1996 [JP] Japan ................................. 8-124674

[51] Int. Cl.[6] .................................................. A47B 51/00
[52] U.S. Cl. .......................................... 318/807; 318/632
[58] Field of Search .................................. 318/798–815, 318/632; 363/35–43, 65–70

[56] References Cited

U.S. PATENT DOCUMENTS

| | | | |
|---|---|---|---|
| 4,315,203 | 2/1982 | Ibamoto et al. | 318/807 |
| 4,451,771 | 5/1984 | Nagase et al. | 318/800 |
| 4,808,903 | 2/1989 | Matsui et al. | 318/800 |
| 4,972,186 | 11/1990 | Morris | 340/870.25 |
| 5,038,092 | 8/1991 | Asano et al. | 318/811 |
| 5,321,598 | 6/1994 | Moran | 363/41 |
| 5,384,696 | 1/1995 | Moran et al. | 363/40 |
| 5,389,868 | 2/1995 | Mikami et al. | 318/632 |
| 5,392,607 | 2/1995 | Wu | 62/6 |
| 5,400,240 | 3/1995 | Araki | 363/97 |
| 5,504,404 | 4/1996 | Tamaki et al. | 318/432 |
| 5,574,352 | 11/1996 | Endo et al. | 318/802 |
| 5,841,263 | 11/1998 | Kaneko et al. | 318/807 |

*Primary Examiner*—Jonathan Salata
*Attorney, Agent, or Firm*—Evenson, McKeown, Edwards & Lenahan, P.L.L.C.

[57] ABSTRACT

A motor control device for an AC motor driven by a power converter with a maximum output frequency more than 500 Hz has a digital arithmetic unit which performs current-feedback control of the AC motor up to a maximum output frequency of the power converter, and outputs an AC voltage command to the power converter. The digital arithmetic unit includes a voltage control signal calculating unit for calculating a vector sum of the d-axis current deviation from a first subtracting unit and the q-axis current deviation from a second subtracting unit based on the d-axis and q-axis phases from a phase calculating unit as well as for calculating a d-axis voltage control signal and a q-axis voltage control signal according to the calculated vector sum, and performs current integration control for the d-axis and q-axis using the calculated vector sum as an input value. The AC voltage command is calculated based on the d-axis voltage control signal and the q-axis voltage control signals.

3 Claims, 6 Drawing Sheets

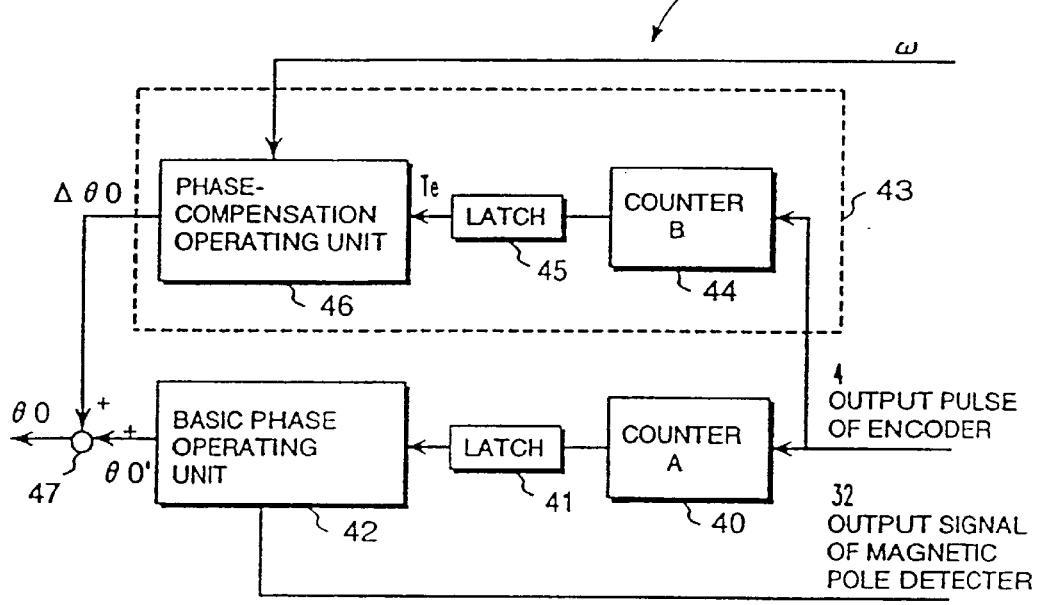
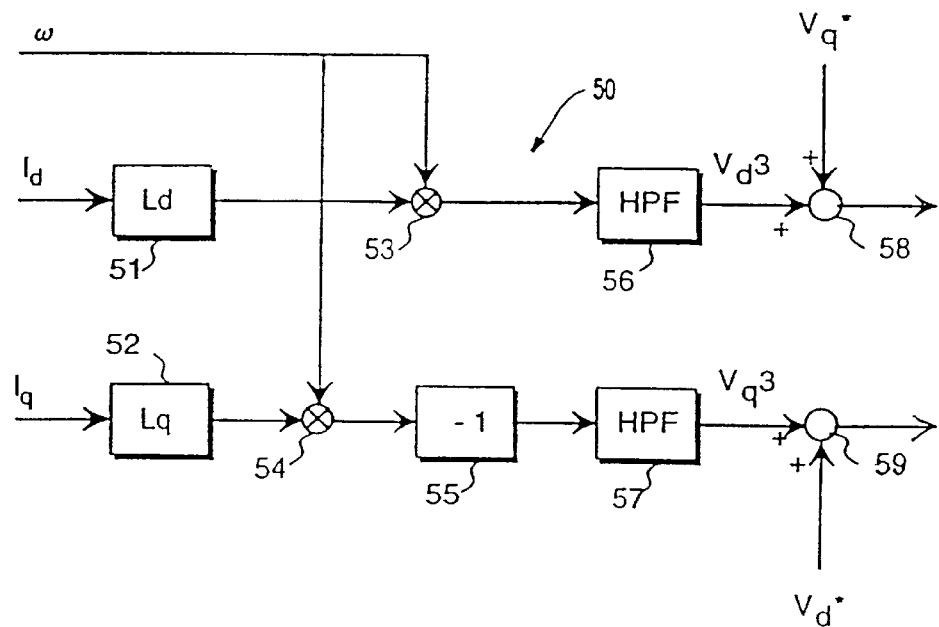

MOTOR CONTROL DEVICE FOR HIGH FREQUENCY AC DRIVEN MOTOR

This is a continuation application of Ser. No. 08/859,087 filed on May 20, 1997, now U.S. Pat. No. 5,841,263.

This application claims the priority of Japanese patent application JP-8-124674, the disclosure of which is expressly incorporated by reference herein.

BACKGROUND OF THE INVENTION

The present invention relates to a method and apparatus for motor control in an electric vehicle in which a current feedback control for an alternating current (AC) motor is performed by using a digital arithmetic unit.

In conventional motor control equipment, the maximum output frequency of a power converter is in the neighborhood of 400 MHz. When current feedback control for an AC motor is performed at this frequency by using digital arithmetic means such as a microcomputer, etc., the primary current which flows in an AC motor and the rotational phase of the motor are detected first. Then a d-axis current, which controls the magnetic flux of the AC motor by the primary current and the rotational phase, and a q-axis current orthogonal to the d-axis current, are detected.

Feedback control is performed so that the detected d-axis and q-axis currents can match up to the respective commands, and thereby a d-axis voltage command and a q-axis voltage command are obtained. In such feedback control, PI (Proportional Integral) control is generally carried out independently in the d-axis and the q-axis, so that the deviation between the current command values of the d-axis and the q-axis and the detected values can be equal to zero.

An example of motor control equipment in which a current feedback control for an AC motor is performed is disclosed, for example, in Japanese Patent Publication No. 3-1917 (1991). In this example, in consideration of the component of the voltage generated by the inductance of the load in an electric current control system for the AC motor, the deviation between the command value and the measured value of the d-axis current is applied to the q-axis voltage supplied to the power converter, and the deviation between the command value and the measured value of the q-axis current is applied to the d-axis voltage supplied to the power converter. In this manner, it is possible to achieve stable control, without interaction between the d-axis and the q-axis.

Further, an example of the phase correction for the digital control system is disclosed in Japanese Patent Application Laid-open No.6-335277(1994). In this example, the motor control equipment comprises a rotation compensating means for adding the angle of rotation which delays according to the sampling time, another rotation compensating means for adding the angle of rotation which delays according to the sampling hold time, and a further rotation compensating means for adding the angle of rotation which delays according to the data read-in delay time. Thereby, it becomes possible to eliminate the delay of the angle of rotation due to the sampling.

However, the above-mentioned examples have the following problem.

The AC control equipment disclosed in Japanese Patent Publication No. 3-1917 is effective to maintain the stability when the angular frequency of the AC motor increases up to one tenth of the sampling frequency of the arithmetic unit, and thus the sampling error of the phase detection of the AC motor has an effect on the current control system. However, because the angular frequency is directly multiplied by the deviation of the q-axis and that of the d-axis when the deviation of the q-axis current is applied to the d-axis voltage and that of the d-axis current is applied to the q-axis voltage, the gain of the integration may be changed. As a result, there is a concern that the current control system does not have the response as designed. Accordingly, it is impossible to increase the angular frequency of the AC motor, for example, to more than 400 Hz.

In the AC control equipment disclosed in Japanese Patent Application Laid-Open No. 6-335277, the delay of the phase detection is compensated. Therefore, it is effective to maintain the stability when the sampling error of the phase detection of the AC motor has an effect on the current control system. However, when the AC motor is miniaturized and the output frequency of the power converter is increased so that the maximum output frequency of the power converter reaches approximately one tenth of the sampling frequency of the digital arithmetic unit (for example, more than 500 Hz), the impact of the detection error of the rotational phase on the control system cannot be neglected. As a result, in the normal PI control performed independently in the respective axes, the interference component between the d-axis and the q-axis is no longer compensated, and the stability of the control system deteriorates. Further, it becomes impossible to perform current feedback control. Even if it is possible to maintain the stability of the control system, there are concerns that the accuracy of detection of the d-axis current and the q-axis current deteriorates, or the resolution of the speed detector decreases and thus the d-axis current and the q-axis current include a ripple current. Such a ripple current causes pulsation in rotation of the AC motor. Therefore, for example, in the AC motor for an electric vehicle, the running performance and/or the riding comfort may decrease.

Therefore, as in Japanese Patent Publication No. 3-1917, it is also impossible to increase the angular frequency in the motor control equipment disclosed in Japanese Patent Application Laid-Open No. 6-335277.

SUMMARY OF THE INVENTION

An object of the present invention is to provide motor control equipment for electric vehicles, in which it is possible to perform the current control with stability and which satisfies the required response performance, even if the AC motor is miniaturized and the angular frequency of the AC motor is increased (that is, even if the maximum output frequency of the power converter exceeds 500 Hz.

Another object of the present invention is to provide motor control equipment for electric vehicles, in which ripple currents and detection errors for the d- and q-axis currents, which occur when the output frequency of the power converter is increased, are minimized, so that it is possible to control the current with stability and at the same time, to satisfy the required response performance In order to attain the above objects, the present invention is configured as follows.

(1) Motor control equipment has a power converter with a maximum output frequency of at least 500 Hz, an AC motor driven by the power converter, and a digital arithmetic means which outputs an AC voltage command to the power converter by performing currentfeedback control of the AC motor up to the maximum output frequency of the power converter.

The digital arithmetic unit includes a first subtractor for calculating the deviation between a detected value and a command value for the d-axis current (which controls the magnetic flux of the AC motor), a second subtractor for calculating the deviation between a detected value and a command value for the q-axis current (orthogonal to the d-axis current), a phase calculator for calculating a d-axis phase corresponding to the resistance and reactance components of the impedance of the d-axis, and a q-axis phase corresponding to the resistance components of the impedance of the q-axis, and a voltage control calculator for calculating control signals for the d- and q-axis voltages, due to the d-axis current deviation and the q-axis current deviation, based on the d-axis phase and the q-axis phase.

In this manner, the AC voltage command is output to the power converter, based on the d- and q-axis voltage control signals.

Even if the output frequency of the power converter increases, and thus the rotational phase detection error due to the sampling has an impact upon the control system, it is possible to maintain the stability by using the above-mentioned configuration.

(2) According to another aspect of the present invention, motor control equipment has a power converter with a maximum output frequency of at least 500 Hz, an AC motor driven by the power converter, and a digital arithmetic means which outputs an AC voltage command to the power converter by performing current-feedback control of the AC motor up to the maximum output frequency of the power converter.

The digital arithmetic unit includes a phase detector with a phase controller for controlling the phase of said AC motor and a current-detection-delay phase compensator for compensating the phase obtained by the phase controller based on the angular frequency and the delay time of a primary current detection of said AC motor, and a current converter for converting a current of the AC motor into two currents orthogonal to each other. With this arrangement, the current-feedback control is performed on the basis of the two currents converted by said current converting means.

In the above configuration, the detected values of the d-axis current and the q-axis current are equal to the d-axis current and the q-axis current, respectively, which actually flow to the AC motor.

(3) Preferably, in the configuration (1), the digital arithmetic unit further includes a phase detector having a phase controller for controlling the phase of the AC motor and a current-detection-delay phase compensator for compensating the phase obtained by the phase controller based on the angular frequency and the delay time of a primary current detection of said AC motor, and a current converter for converting a current of the AC motor into the d-axis and q-axis currents orthogonal to each other. Thereby current-feedback control is performed on the basis of the two currents converted by said current converting means.

(4) In a further aspect of the present invention, motor control equipment having a power converter with a maximum output frequency of at least 500 Hz, an AC motor driven by the power converter, a digital arithmetic means which outputs an AC voltage command to the power converter by performing current-feedback control of the AC motor up to the maximum output frequency of said power converter, and a speed detector for detecting the rotating speed of the AC motor.

The digital arithmetic unit includes a phase detector having a phase controller for controlling the phase of said AC motor and a detected phase compensator for compensating a phase detection error (which occurs due to the resolution of speed detector) based on the angular frequency and an output signal of said speed detector, and a current converter for converting a current of the AC motor into two currents orthogonal to each other. Current-feedback control is performed on the basis of the two currents converted by said current converting means.

With the above configuration, even if the AC motor become operable at a high speed so that the d- and q-axis currents include ripple currents, it is possible significantly to suppress such ripple currents.

(5) In a further aspect of the present invention, motor control equipment has a power converter with a maximum output frequency of at least 500 Hz, an AC motor driven by the power converter, and a digital arithmetic means which outputs an AC voltage command to the power converter by performing current-feedback control of the AC motor up to the maximum output frequency of the power converter.

The digital arithmetic unit comprises a first subtractor for calculating the deviation between detected and command values of the d-axis current (which controls the magnetic flux of the AC motor), a second subtractor for calculating the deviation between detected and command values of the q-axis current (orthogonal to the d-axis current), a voltage control calculator for calculating control signals for the d- and q-axis voltages, due to the d-axis current deviation and the q-axis current deviation, based on the d-axis phase and the q-axis phase, and a harmonic suppressing unit for correcting the q-axis voltage control signal by extracting a harmonic component from the detected value of the d-axis current, and correcting the d-axis voltage control signal by extracting a harmonic component from the detected value of the q-axis current. Thereby the AC voltage command is output to the power converter, based on the corrected d- and q-axis voltage control signals.

In this configuration, it is possible to suppress harmonic components included in the d-axis current and the q-axis current.

(6) Preferably, in the configuration (1), the digital arithmetic unit further comprises a phase detector having a phase controller for calculating the phase of said AC motor, a detected phase compensator for compensating an error of the phase detection (due to the resolution of the speed detector) based on the angular frequency and an output signal of said speed detector, and a current-detection-delay phase compensating unit for compensating the phase obtained by the phase operating part based on the angular frequency and the delay time of a primary current detection of said AC motor, a current converter for converting the current of the AC motor into orthogonal d- and q-axis components, and a harmonic suppressing unit for correcting the q-axis voltage control signal by extracting a harmonic component from the d-axis current, and correcting the d-axis control signal by extracting a harmonic component from the q-axis current.

Thereby, the AC voltage command is output to the power converter, based on the corrected control amount of the d-axis voltage and the corrected control amount of the q-axis voltage.

Other objects, advantages and novel features of the present invention will become apparent from the following detailed description of the invention when considered in conjunction with the accompanying drawings.

BRIEF DESCRIPTION OF THE DRAWINGS

FIG. 7 is a circuit diagram of a phase controller of the circuit shown in FIG. 4;

FIG. 9 is a circuit diagram of a high frequency suppressor of the motor control equipment shown in FIG. 8.

DESCRIPTION OF THE PREFERRED EMBODIMENTS

Figure 1:
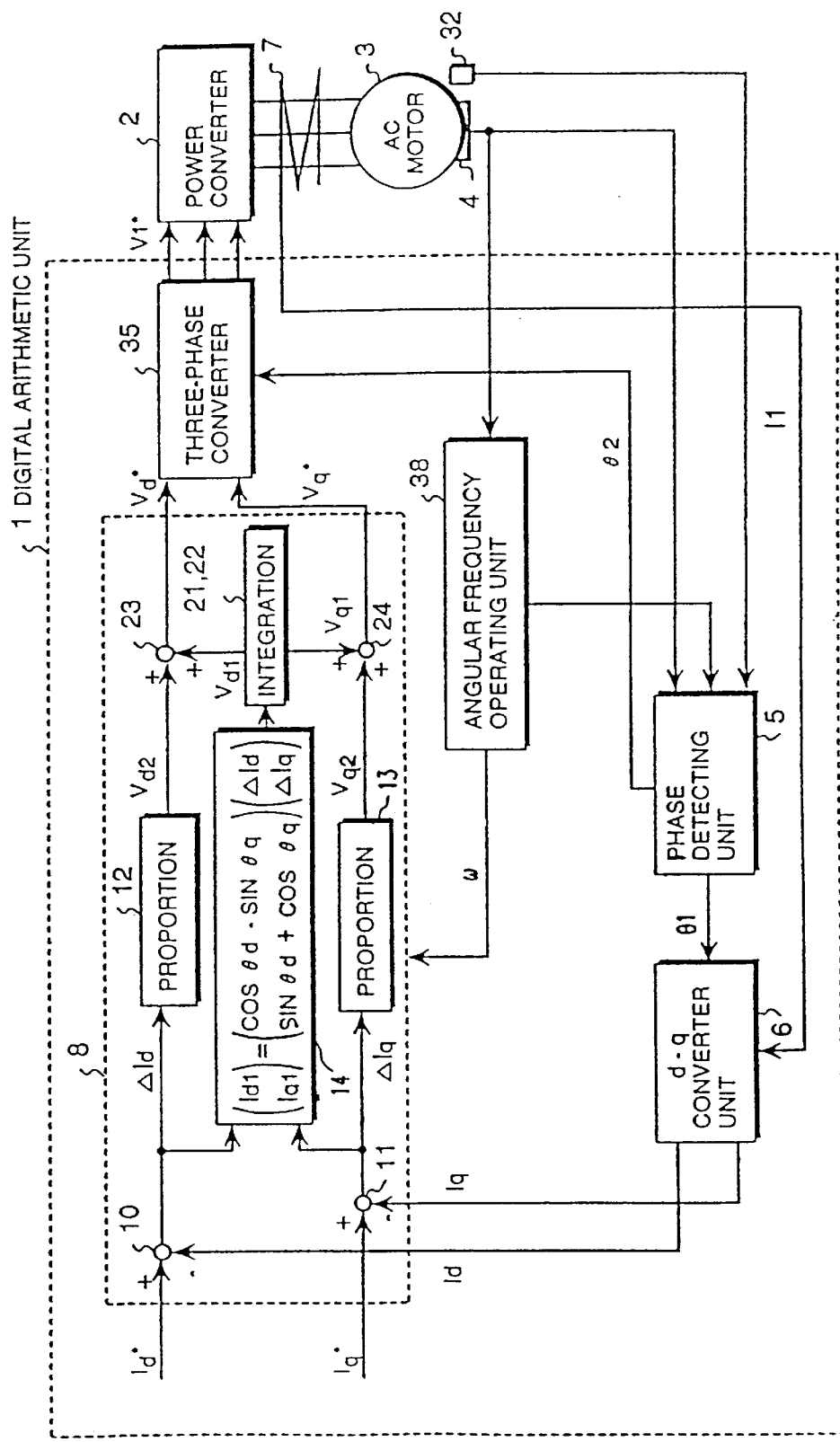
FIG. 1 is a block diagram showing motor control equipment according to an embodiment of the present invention.

FIG. 1 is a block diagram showing motor control equipment according to an embodiment of the present invention, applied to the motor control equipment for an electric vehicle. This motor control equipment can perform current control while satisfying the required response performance. Further, it is stable even if the maximum output frequency of a power converter is equal to or more than 500 Hz.

In FIG. 1, a digital arithmetic unit 1 calculates a command value Id* of a d-axis current, which controls the magnetic flux of the AC motor 3, and a command value Iq* orthogonal to the d-axis current by means of a calculating unit (not shown), and supplies the command values Id* and Iq* to subtracters 10 and 11 of a current-feedback control unit 8.

The digital arithmetic unit 1 controls the current so that the detected d-axis and q-axis currents match up to the command values Id* and Iq*, respectively, and outputs a three-phase AC voltage command value V1* to the power converter 2, which supplies an AC power to the AC motor 3 based on the voltage command value V1*. The AC motor 3 receives the AC power and generates the required torque. Here, the current control performed in the digital arithmetic unit 1 is a d-q axis current control in a rotating coordinate system.

In operation, the digital arithmetic unit 1 firstly receives a speed signal output from a speed detector 4 of the AC motor 3, and calculates a rotational phase θ of the AC motor 3 by a phase detecting means 5.

Further, in the d-q converter 6, the d-axis current Id and the q-axis current Iq are obtained from the rotational phase θ and the primary current I1 detected by the current detector 7. Here, the d-q converter 6 performs two-phase conversion in the rotating coordinate system by using the three-phase AC current and the rotational phase of the AC motor 3.

Thereafter, the detected d-axis current Id is subtracted from the command value Id* of the d-axis current in a subtracter 10, and the detected q-axis current Iq is subtracted from the command value Iq* of the q-axis current in a subtracter 11, so that current feedback control is performed.

Figure 2:
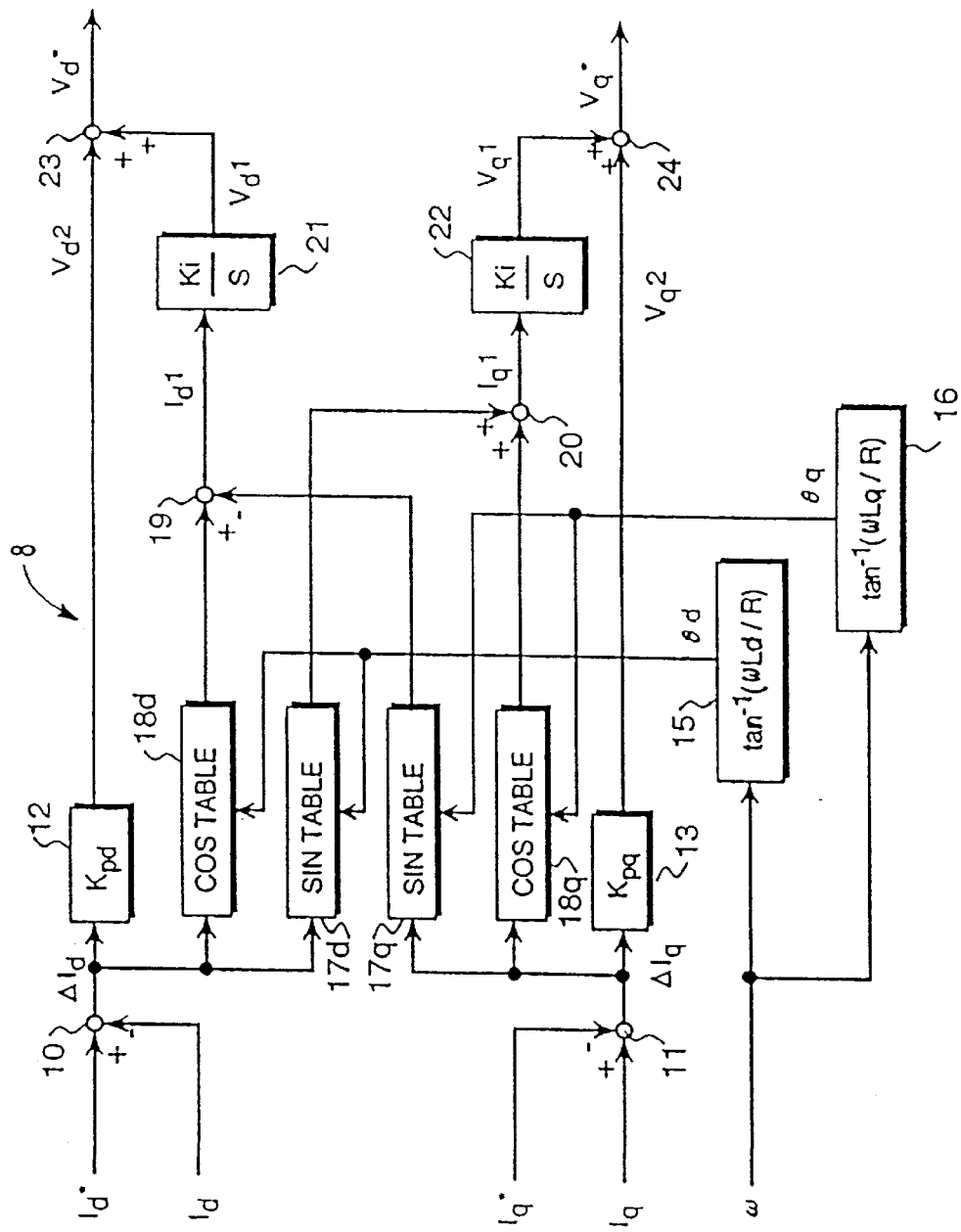
FIG. 2 is a circuit diagram of a current-feedback control unit of the motor control equipment shown in FIG. 1.

Next, the configuration of the current-feedback control unit 8 of the motor control equipment will be explained in detail with reference to FIG. 2. The deviation ΔId (d-axis current deviation) between the d-axis current command value Id* and the d-axis current value Id, and the deviation ΔIq (q-axis current deviation) between the q-axis current command value Iq* and the q-axis current value Iq are obtained by first and second subtracters 10 and 11, respectively. A d-axis proportional voltage control signal Vd2 is calculated by multiplying the deviation ΔId by the proportional gain Kpd in a multiplier 12. Further, A q-axis proportional voltage control amount Vq2 is calculated by multiplying the deviation ΔIq and the proportional gain Kpq by a multiplier 13. Furthermore, in order to carry out the calculation shown in block 14 by inputting the deviations ΔId and ΔIq, a d-axis integral input amount Id1 and a q-axis integral input amount Iq1.

Concretely, the angular frequency ω of the AC motor 3 determined by an angular frequency operating unit 38 shown in FIG. 1 is input to phase tables 15 and 16. An inductance component Ld and a resistance component R of the d-axis are pre-stored in the phase table 15, and the an inductance component Lq and a resistance component R of the q-axis are pre-stored in the phase table 16.

A phase θd consisting of the inductance component Ld and the resistance component R of the d-axis impedance is obtained in the phase table 15 by substituting the angular frequency ω into $\tan^{-1}(\omega Ld/R)$. Further, a phase θq consisting of the inductance component Lq and the resistance component R of the d-axis impedance is obtained in the phase table 15 by substituting the angular frequency ω into $\tan^{-1}(\omega Lq/R)$ ($\omega Ld$ and $\omega Lq$ are reactance components of the d-axis and q-axis impedances).

Actually, there is not a substantial difference between the phases θd and θq. It is, therefore, possible to use only one phase table, to decrease the software, because it can be assumed that θd=θq. The obtained phase θd is supplied to a SIN table 17d and a COS table 18d, and SIN(θd) and COS(θd) are calculated. Further, The obtained phase θq is supplied to a SIN table 17q and a COS table 18q, and SIN(θq) and COS(θq) are calculated. Then ΔId COS(θd) is calculated in COS table 18d, and ΔId·SIN(θd) is obtained in SIN table 17d. Similarly, ΔIq·COS(θq) is obtained in COS table 18q, and ΔIq·SIN(θq) is obtained in SIN table 17q.

Next, the output of the SIN table 17q is subtracted from the output of COS table 18d by a subtracter 19, and the d-axis integral input amount Id1=ΔId·COS(θd)−ΔIq·SIN(θq) is obtained. Further, the output of the SIN table 17d is added to an output of COS table 18q by an adder 20, and the q-axis integral input amount Iq1=ΔIq·COS(θq)−ΔId−SIN(θd) is obtained. The obtained d-axis integral input amount Id1 is input to an integrator 21, where it is multiplied by design gain Ki to obtain the integral voltage control signal Vd1. Further, the obtained d-axis integral input amount Id1 is input to an integrator 22, where it is multiplied by a design gain Ki to obtain the integral voltage control signal Vq1.

The output Vd1 of the integrator 21 and the output Vd2 of the multiplier 12 are added in an adder 23 to obtain the d-axis voltage control signal Vd*, while the output Vq1 of the integrator 22 and the output Vq2 of the multiplier 13 are added in an adder 24 to obtain the q-axis voltage control signal Vq*. Vd* and Vq* are then supplied to a three-phase converter 35 shown in FIG. 1 which outputs the three phase AC voltage command V1* to the power converter 2, based on the compensated phase θ2 from the phase detecting means 5.

Based on the d-axis phase and the q-axis phase as described above, the vector sum between the d-axis current deviation and the q-axis current deviation is calculated. The d-axis voltage control signal and the q-axis voltage control signal are obtained according to the calculated vector sum, thereby performing current control of the AC motor 3.

More specifically, the d-axis integral input amount Id1=ΔId·COS(θd)−ΔIq·SIN(θq) is integrated in the integrator unit 21. The value obtained by adding the integrated result to Vd2 is set as the d-axis voltage control. Similarly, the q-axis integral input amount Iq1=ΔIq·COS(θq)−ΔId·SIN (θd) is integrated in the integrator unit 22. The value obtained by adding the integrated result to Vq2 is set as the q-axis voltage control signal. Thereby the current control is performed.

It is, therefore, possible to perform current control without varying the storage gain and in consideration of the d-axis and the q-axis interference components.

Even if the output frequency of the power converter increases, so that the rotational phase detection error due to the sampling has an impact upon the control system, it is possible to maintain the stability by using the above-mentioned configuration.

In the conventional current control method, if the frequency of the AC motor increases, and thus the detection error of the rotational phase increases, the control system may become unstable.

It is advantageous to switch to the current control method when the motor frequency reaches a predetermined level, in order to achieve stable current control. According to the inventors' experiments, it is desirable to set the predetermined frequency level to at least 500 Hz. However, if the motor frequency exceeds 2 KHz, it may become impossible to perform current control due to the effect of sampling.

It may be possible to switch to the current control method when the current deviation of either the d-axis or that the q-axis exceeds a predetermined value. By using the above-mentioned method, it becomes possible to achieve stable current control even in a high frequency region where the stability of the control system cannot be maintained by the conventional control method.

Next, the phase detecting means 5 of the motor control equipment shown in FIG. 1 will be explained.

Normally, in the detection of the primary current in the digital arithmetic unit 1, there is a detection delay, attributable for example to the delay due to the current detector itself, a filter, A/D conversion, and so on. When the angular frequency of the AC motor 3 increases, so does the maximum output frequency of the power converter 2, and the accuracy of the detection of the d-axis current and the q-axis current deteriorates due to the detection delay time of the primary current.

Figure 3:
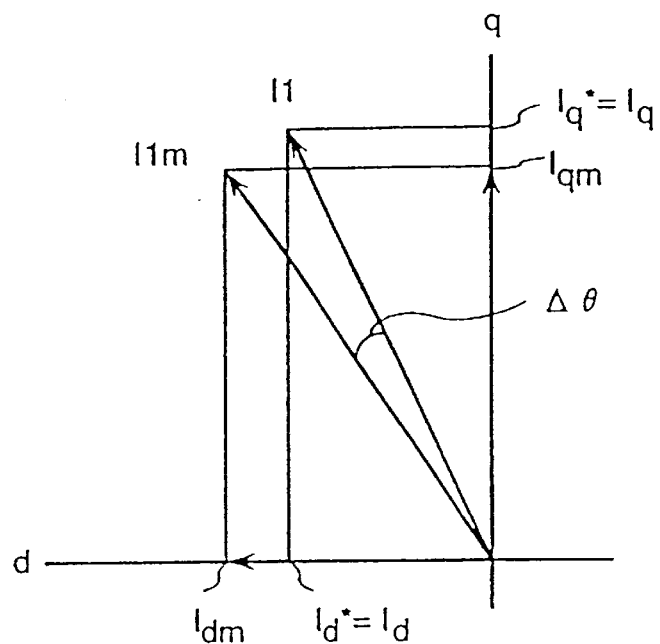
FIG. 3 is a graph which shows vectors of a primary current in the absence of current-detection-delay phase compensation.

The cause of the deterioration will be explained with reference to the vectors shown in FIG. 3. First, the primary current I1 detected by the digital arithmetic unit 1 is converted in a rotating coordinate system two-phase conversion, based on the detected phase. At this time, the detected values of the d-axis current and the q-axis current are equal to Id and Iq, respectively. In a steady state in which current control is performed, the command values Id*=Id and Iq*=Iq.

However, because the primary current experiences a detection delay, the primary current which actually flows through the AC motor is a current I1m which leads with respect to the current I1 by the phase angle Δθ corresponding to the delay time. Accordingly, the d-axis current and the q-axis current which actually flow through the AC motor are currents Idm and Iqm, respectively, and they are different from the respective command values Id* and Iq*. Therefore, in the present invention, a current-detection-delay phase compensating unit 31 is provided in the phase detecting means 5 as shown in FIG. 4 in order to prevent deterioration of the accuracy of detection of the d-axis current and the q-axis current.

Figure 4:
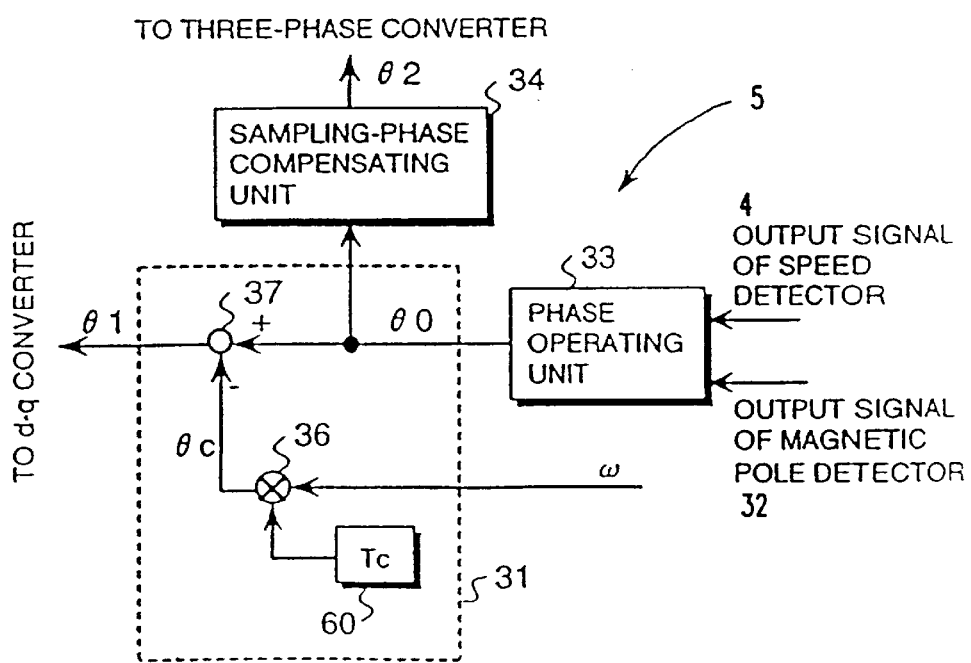
FIG. 4 is a circuit diagram of a current detector of the motor control equipment shown in FIG. 1.

In the phase detecting means 5 of FIG. 4, signals from the speed detector 4 and a magnetic pole detector 32 (see FIG. 1) are input to a phase operating unit, and the rotational phase θ0 of the AC motor 3 is calculated. Further, in the current-detection-delay phase compensating unit 31, the angular frequency ω of the AC motor 3 is supplied from an angular frequency operating unit 38, and the angular frequency ω and delay time Tc stored in the current-detection-delay-time storing unit 60 are multiplied by a multiplier 36 to obtain the phase θc corresponding to the delay time. (The phase θc is equal to the phase Δθ in FIG. 3.) The delay time Tc can be calculated from the design value of the AC motor 3 and is pre-stored in a memory 60.

Next, the phase θc corresponding to the delay time is subtracted from the rotational phase θ0 supplied from the phase operating unit 33 in a subtracter 37, to obtain a compensated phase θ1 to be output the d-q converting unit 6.

In the phase detecting unit 5, there is also provided a sampling phase compensating unit 34, which receives the rotational phase θ0, and calculates the compensated phase θ2 to be output to a three-phase converting unit 35.

The operation of the current-detection-delay phase compensating unit 31 will be explained with reference to the vectors shown in FIG. 5.

As described above, due to the detection delay the detected value I1 is delayed by the phase Δθ relative to the primary current I1m which actually flows through the AC motor 3. Accordingly, the phase Δθ is calculated (Δθ=θc=ωTc), the d-q coordinates due to the rotational phase θ0 are delayed by the phase θc corresponding to the delay time, and the detected value I1 of the primary current is d-q converted by using d'-q' coordinates.

By using the above method, the phase angle β of the actual current equals the phase angle β' of current in the control system. As a result, the detected values Id and Iq of the d-axis and the q-axis currents equal the d-axis and the q-axis currents Idm and Iqm which actually flow through the AC motor 3. It is therefore possible for the actual currents Idm and Iqm to equal the command values Id* and Iq* of the d-axis and the q-axis currents, respectively, in a steady state.

The configuration of the phase operating unit 33 (FIG. 4) in the phase detecting unit 5 will be explained next. The phase operating unit 33 compensates for the phase detection error caused by low resolution of the speed detector 4.

Normally, a pulse encoder is used as a speed detector attached to motor control equipment, in which the number of pulses is adopted to the performance of the control system and the motor. However, in motor control equipment for electric vehicles, such an encoder with fewer pulses is used in consideration of the cost.

In such control of the AC motor, because the rotational phase of the AC motor is obtained from an output signal of an encoder, the error of the phase detection increases in a high frequency region due the low resolution of the encoder (that is, due to number of few pulses) The control system may have a bad effect.

Figure 6:
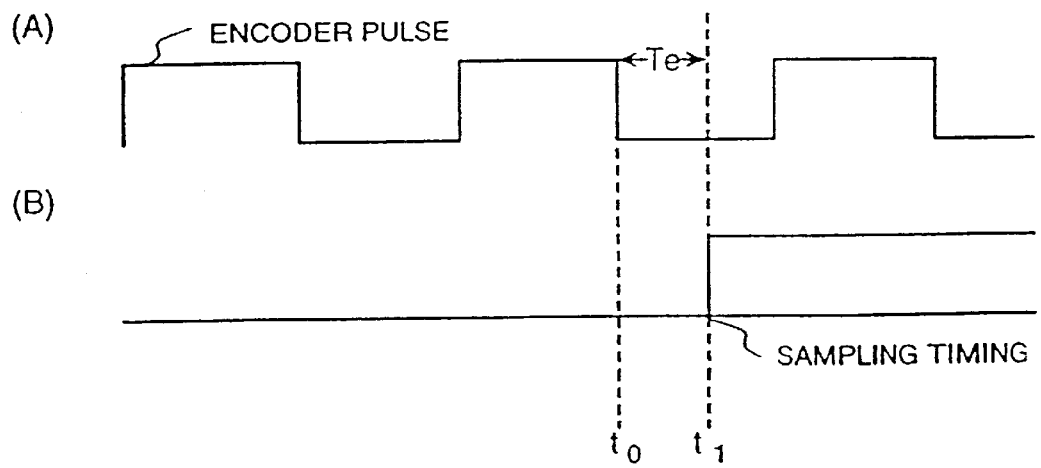
FIG. 6 is an illustration of the occurrence factor of a pease detection error caused due to resolution of an encoder.

FIG. 6 illustrates the occurrence of a phase detection error caused due to the resolution of an encoder. When encoder pulses are generated as shown in (A) of FIG. 6 and the sampling timing of the digital arithmetic unit 1 is generated at a time point t1 as shown in (B) of FIG. 6, the time difference Te exists between an encoder pulse (time point t0) and a sampling timing (time point t1).

Because the rotational phase of the AC motor 3 is calculated by using the number of the output pulses of the encoder in the digital arithmetic unit 1, the phase corresponding to the time difference Te becomes the phase detection error. The phase detection error increases with a decrease in the number of encoder pulses, and with higher speed of the AC motor 3, which has an impact on the current control system. To avoid such a condition, there is provided a detected phase compensating unit 43 in the phase operating unit 33 as shown in FIG. 7.

FIG. 7 is a circuit diagram of a phase operating unit 33 of the circuit shown in FIG. 4. In FIG. 7, a counter A 40 of the phase operating unit 33 counts output signals of the speed detector 4 (that is, output pulse signals of the encoder), latches the number of pulses every sampling time by using a latch circuit 41, and outputs to a basic phase operating unit 42. The basic phase operating unit 42 calculates the rotational phase θ0' of the AC motor 3, making correction by using signals from the magnetic pole detector 32. The detected phase compensating unit 43 operates as follows.

The output signals of the speed detector 4 (or output pulse signals of the encoder) are input, and the elapsed time from the occurrence of a pulse signal is determined. The output of the counter B is latched at a sampling timing by a latch circuit 45. The latch circuit 45 outputs the time difference Te between an encoder pulse and a sampling timing, to a phase-compensation operating unit 46, which calculates a phase compensation value Δθ0, from the time difference Te and the angular frequency ω of the AC motor 3. The phase compensation value Δθ0 and the rotational phase θ0' are added in an adder 47, so that the rotational phase θ0' is compensated.

According to use of the above configuration, even if the number of output pulses of the encoder 4 decreases or even if the AC motor become operable at a high speed (and as a result the d-axis current and the q-axis current include ripple currents) it is possible substantially to suppress such ripple currents.

It is possible to perform current control without varying the storage gain and in consideration of the d-axis and the q-axis interference components.

Even if the output frequency of the power converter increases, and thus the rotational phase detection error due to the sampling has an impact upon the control system, it is possible to maintain stability by using the above-mentioned configuration.

Further, the detected values Id and Iq of the d-axis and the q-axis currents become equal to the d-axis and the q-axis currents Idm and Iqm which actually flow through the AC motor 3. It is, therefore, possible for the actual currents Idm and Iqm to equal the command values Id* and Iq* of the d-axis and the q-axis currents, respectively, in a steady state.

Another embodiment of the present invention will be explained hereinafter, in which disturbances such as ripple currents included in the d-axis and the q-axis currents, or the superimposition of harmonic waves on the d-axis and the q-axis currents caused by the interference between the d-axis and the q-axis, can be suppressed.

Figure 8:
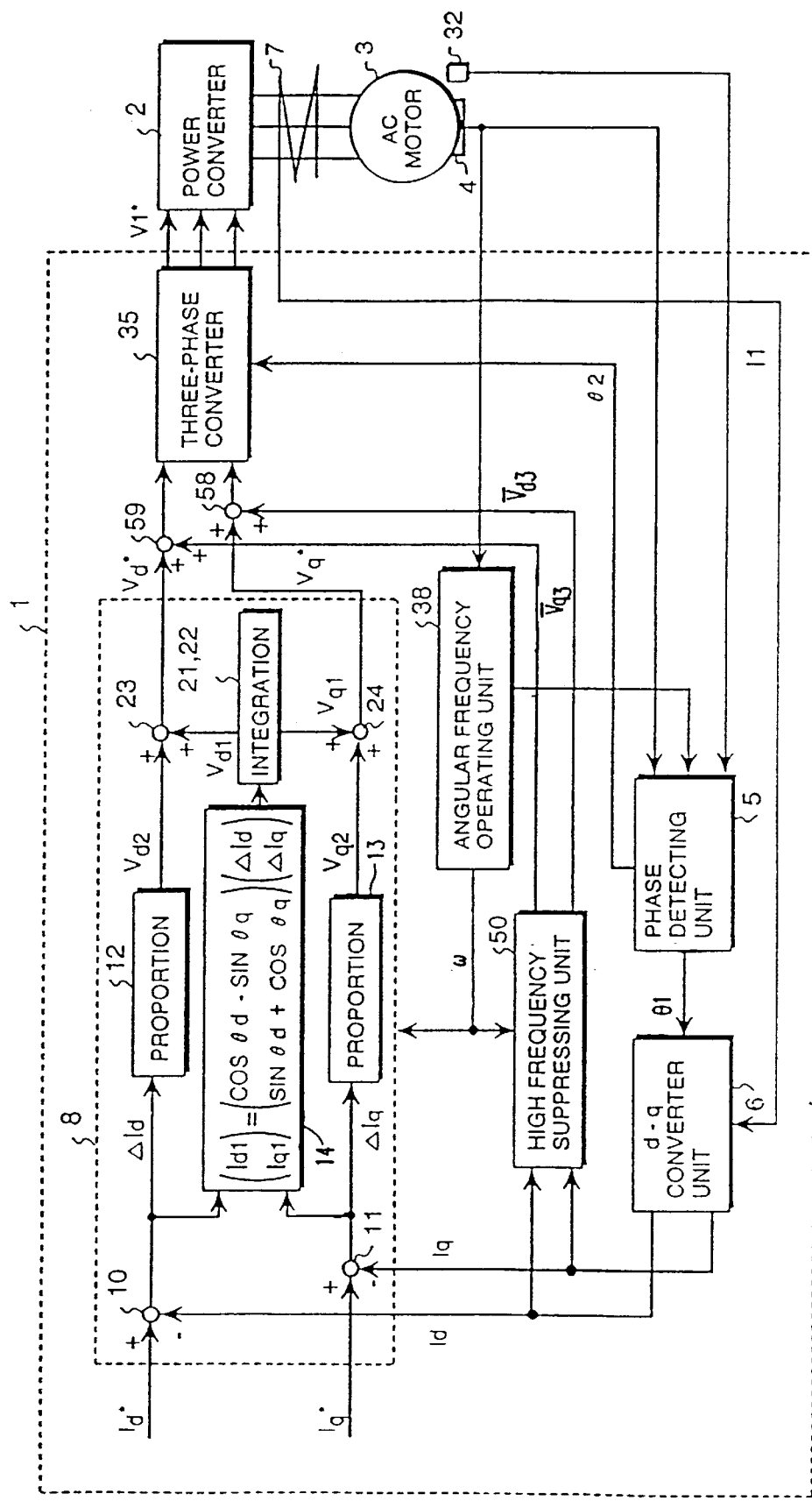
FIG. 8 is a block diagram showing motor control equipment according to another embodiment of the present invention.

FIG. 8 is a block diagram showing motor control equipment according to another embodiment of the present invention. (Like reference numerals designate like components in FIGS. 1 and 8.) In the embodiment of FIG. 8, an adder 58 is provided between the adder 24 and the three-phase converter 35; and an adder 59 is provided between the adder 23 and the three-phase converter 35. Further, there is provided a high frequency suppressing unit 50 (high harmonic wave suppressing unit) to which output signals Id and Iq from the d-q converter 6 and angular frequency ω from the angular frequency operating unit 38 are supplied. An output signal of the high frequency suppressing unit 50 is output to the adders 58 and 59.

FIG. 9 is a circuit diagram of the high frequency suppressing unit 50 of the motor control equipment shown in FIG. 8.

In FIG. 9, the detected value Id of the d-axis current and the detected value Iq of the q-axis current are supplied to multipliers 51 and 52, respectively, in which the detected value Id is multiplied by the d-axis inductance Ld, and the detected value Iq is multiplied by the q-axis inductance Lq. The product of the detected value Id and the inductance Ld is supplied to the multiplier 53, and multiplied by the angular frequency ω of the AC motor 3. Further, The product of the detected value Iq and the inductance Lq is supplied to the multiplier 54, and multiplied by the angular frequency ω of the AC motor 3.

An output signal of the multiplier 53 is supplied through a high-pass filter 56 to an adder 58 as a control signal Vd3 in non-interference control to the harmonic waves. The output signal Vd3 is added to an output signal Vq* of the adder 24. As a result, the compensated signal Vq* is supplied to the three-phase converter 35. An output signal of the multiplier 54 is inverted in sign by a multiplier 55 ("−1" is added to the output signal of the multiplier 54), and is supplied through a high-pass filter 57 to an adder 59 as a control signal Vq3 in non-interference control to the harmonic waves. The output signal Vq3 is added to an output signal Vd* of the adder 23. As a result, the compensated signal Vd* is supplied to the three-phase converter 35.

In order to adjust the extent of the suppression of the harmonic waves, a gain controller may be provided in an output stage of the high frequency suppressing unit 50. While the high pass filter is provided in the output stage of the high frequency suppressing unit 50, it may also be provided in its input stage.

In the first embodiment, a conventional phase detecting unit may be used, in which the current-detection-delay phase is not taken into consideration. In such a case, it is possible to perform current control without varying the storage gain and in consideration of the d-axis and the q-axis interference components. Further, even if the output frequency of the power converter increases, and thus the detection error of rotational phase due to the sampling has a significant effect upon the control system, it is possible to maintain the stability by using the above-mentioned configuration.

In the first embodiment, a conventional current feedback control unit may be used. Even in such a case, the detected values Id and Iq of the d-axis and the q-axis currents become equal to the d-axis and the q-axis currents Idm and Iqm which actually flow through the AC motor 3. It is, therefore, possible for the actual currents Idm and Iqm to equal the command values Id* and Iq* of the d-axis and the q-axis currents, respectively, in a steady state.

Figure 5:
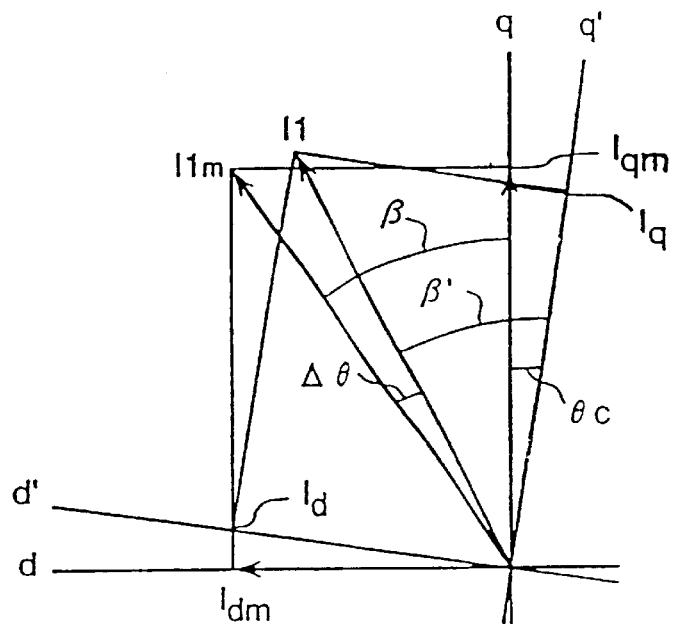
FIG. 5 is a graph which shows vectors of a primary current with current-detection-delay phase compensation.

Instead of the phase operating unit 33 in the phase detecting unit 5 shown in FIG. 5, a conventional configuration different from that of FIG. 7 may be used, in which the error of phase detection is not taken into consideration.

While the described embodiment represents the preferred form of the present invention, it is to be understood that modifications will occur to those skilled in the art without departing from the spirit of the invention. For example, this invention can be applied not only to an electric vehicle, but also to another AC motor.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor control device for an AC motor driven by a power converter with a maximum output frequency more than 500 Hz, comprising:
   a digital arithmetic unit which performs current-feed back control of the AC motor up to a maximum output frequency of the power converter and outputs an AC voltage command to the power converter, wherein the digital arithmetic unit comprises
   a first subtracting unit for calculating a d-axis current deviation between a detected value of d-axis current, which controls magnetic flux of the AC motor, and a d-axis current command value,
   a second subtracting unit for calculating a q-axis current deviation between a detected value of q-axis current, orthogonal to the d-axis current, and a q-axis current command value,
   a phase calculating unit for calculating a d-axis phase based on resistance and reactance components of an impedance of the d-axis; and,
   a voltage control signal calculating unit for calculating a vector sum of the d-axis current deviation and the q-axis current deviation based on the d-axis phase, calculating a d-axis voltage control signal and a q-axis voltage control signal according to the calculated vector sum, and calculating the AC voltage command based on the d-axis voltage control signal and the q-axis voltage control signal.

2. A motor control device for an AC motor driven by a power converter with a maximum output frequency more than 500 Hz, comprising:
   a digital arithmetic unit which performs current-feed back control of the AC motor up to a maximum output frequency of the power converter and outputs an AC voltage command to the power converter, wherein the digital arithmetic unit comprises
   a first subtracting unit for calculating a d-axis current deviation between a detected value of d-axis current, which controls magnetic flux of the AC motor, and a d-axis current command value,
   a second subtracting unit for calculating a q-axis current deviation between a detected value of q-axis current, orthogonal to the d-axis current, and a q-axis current command value,
   a phase calculating unit for calculating a q-axis phase based on resistance and reactance components of an impedance of the q-axis; and,
   a voltage control signal calculating unit for calculating a vector sum of the d-axis current deviation and the q-axis current deviation based on the q-axis phase, calculating a d-axis voltage control signal and a q-axis voltage control signal according to the calculated vector sum, and calculating the AC voltage command based on the d-axis voltage control signal and the q-axis voltage control signal.

3. A motor control device for an AC motor driven by a power converter with a maximum output frequency more than 500 Hz, comprising:
   a digital arithmetic unit which performs current-feed back control of the AC motor up to a maximum output frequency of the power converter and outputs an AC voltage command to the power converter, wherein the digital arithmetic unit comprises
   a first subtracting unit for calculating a d-axis current deviation between a detected value of d-axis current, which controls magnetic flux of the AC motor, and a d-axis current command value,
   a second subtracting unit for calculating a q-axis current deviation between a detected value of q-axis current, orthogonal to the d-axis current, and a q-axis current command value,
   a phase calculating unit for calculating a q-axis phase based on resistance and reactance components of an impedance of the d-axis, and a q-axis phase based on resistance and reactance components of an impedance of the q-axis; and,
   a voltage control signal calculating unit for calculating a vector sum of the d-axis current deviation and the q-axis current deviation based on the d-axis and q-axis, calculating a d-axis voltage control signal and a q-axis voltage control signal according to the calculated vector sum, for performing current integration control for the d-axis and q-axis using the calculated vector sum as an input value, and calculating the AC voltage command based on the d-axis voltage control signal and the q-axis voltage control signals.

* * * * *